United States Patent [19]
Lee

[11] Patent Number: 6,062,298
[45] Date of Patent: May 16, 2000

[54] CASE OF AIR CONDITIONING SYSTEM

[75] Inventor: Jong-myoung Lee, Taejon, Rep. of Korea

[73] Assignee: Halla Climate Control Corporation, Taejon, Rep. of Korea

[21] Appl. No.: 08/900,115

[22] Filed: Jul. 25, 1997

[30] Foreign Application Priority Data

Jul. 27, 1996 [KR] Rep. of Korea .................. 96-30863

[51] Int. Cl.[7] .................................................. F25B 29/00
[52] U.S. Cl. .............................. 165/42; 165/43; 165/203; 454/121; 454/126; 454/127; 454/160; 454/161
[58] Field of Search ................................ 165/41, 42, 43, 165/203; 454/127, 121, 75, 126, 160, 161

[56] References Cited

U.S. PATENT DOCUMENTS

| | | | |
|---|---|---|---|
| 4,157,113 | 6/1979 | Karran et al. ........................... | 165/42 |
| 4,216,822 | 8/1980 | Izumi .................................... | 165/42 |
| 4,390,124 | 6/1983 | Nilsson ................................. | 165/41 |
| 4,465,123 | 8/1984 | Sarsten ................................. | 454/75 |
| 5,062,352 | 11/1991 | Ostrand ................................ | 165/42 |
| 5,106,018 | 4/1992 | Loup ................................ | 237/12.3 A |
| 5,109,755 | 5/1992 | Guillemin ........................ | 237/12.3 A |
| 5,154,223 | 10/1992 | Ishimaru et al. ..................... | 165/42 |
| 5,173,078 | 12/1992 | Robin et al. ......................... | 454/127 |
| 5,564,979 | 10/1996 | Sumiya et al. ....................... | 454/121 |
| 5,676,595 | 10/1997 | Sumiya et al. ....................... | 454/121 |
| 5,699,851 | 12/1997 | Saida et al. ........................... | 165/43 |
| 5,711,368 | 1/1998 | Ito et al. ............................... | 165/43 |

FOREIGN PATENT DOCUMENTS

| | | | |
|---|---|---|---|
| 2631287 | 11/1989 | France ................................. | 165/42 |
| 3421323 | 12/1985 | Germany ............................. | 454/121 |
| 0087709 | 6/1982 | Japan .................................... | 165/43 |
| 2-15508 | 1/1990 | Japan . | |
| 5-69731 | 3/1993 | Japan .................................... | 165/43 |
| 6-74548 | 3/1994 | Japan .................................... | 454/121 |
| 2168786 | 6/1986 | United Kingdom ............. | 237/12.3 A |
| WO92-05043 | 4/1992 | WIPO .................................... | 165/43 |

*Primary Examiner*—John K. Ford
*Attorney, Agent, or Firm*—Leydig, Voit & Mayer

[57] ABSTRACT

A case of an air conditioning system for a car includes a main body having a main path through which air supplied from a blower unit passes and a first path formed at the exit of the main path, a housing portion formed on top of the main body in which second and third paths communicating with the main path are formed, a rotating door which has an air stream path and which has rotatably installed inside the housing portion for selectively providing air received from the main path to the second and third paths, a heat exchanger installed in the main path, and a door unit installed on the boundary between the housing portion and the main path of the main body for allowing some or all of the air supplied from the blower unit to pass to the housing portion or to pass to the housing portion via the heat exchanger.

12 Claims, 16 Drawing Sheets

CASE OF AIR CONDITIONING SYSTEM

BACKGROUND OF THE INVENTION

The present invention relates to an air conditioning system of a car, and more particularly, to a case of an air conditioning system for a car for selectively providing air passed through a heat exchanger to respective ducts for air conditioning the inside of a car.

In a general air conditioning system for a car for cooling or heating the inside of a car, the inside of a car is cooled or heated by providing air which is supplied from a blower unit and selectively passed through an evaporator through which a refrigerant flows and a heater core through which cooling water flows, to the inside of the car through a duct.

FIG. 1 shows the case of such an air conditioning system.

A main path Pi through which air provided from the blower unit 1 flows and a defrost path P2 and a vent path P3 communicating with the main path P1 are formed in a case 10 of the air conditioning system. The defrost path P2 and the vent path P3 are formed in the upper portion of the case 10 on an exit side of the main path P1. A floor path P4 is formed on the side surface of the case 10.

In the main path P1, an evaporator 200 through which a refrigerant flows and a heater core 100 through which cooling water of an engine flows are installed. The evaporator 200 and the heater core 100 are separated from each other by a predetermined distance. The heater core 100 is positioned in the lower portion of the boundary between the defrost path P2 and the vent path P3. In the defrost path P2, the vent path P3, and the floor path P4, doors 11a, 12a, and 14a for opening and closing the respective paths P2, P3 and P4 are installed. A bypass door 15 is installed between the upper end portion of the main path P1 and the upper end portion of the heater core 100. Each of the doors 11a, 12a, 14a, and 15b driven by a cable connected to an actuator or a manipulating lever (not shown).

In the case of the air conditioning system constructed as mentioned above, heating or cooling is performed by providing air which is supplied from the blower unit 1 and selectively passed through the heater core 100 or the evaporator 200 to the inside of a car through a path in which the respective doors formed thereon are opened.

However, since a plurality of doors for opening and closing the respective paths are installed, a driving apparatus for opening and closing the doors is complicated and much space for installing the driving apparatus is required.

Also, the air supplied to the respective paths through the doors may be blocked, thus producing streaming resistance, and the size of the case is relatively large since space is required for rotating the doors.

SUMMARY OF THE INVENTION

It is an object of the present invention to provide a case of an air conditioning system in which a door for opening and closing a path and a door driving apparatus have a simple structure.

It is another object of the present invention to provide a case of an air conditioning system which can effectively improve cooling and heating efficiencies inside a car by reducing resistance against the stream of cooling or heating air.

To achieve the above objects, a case of an air conditioning system for a car according to one aspect of the present invention includes a main body having a main path through which air supplied from a blower unit passes and a first path formed at the exit of the main path. A housing portion formed on top of the main body has second and third paths communicating with the main path formed therein. A rotating door has an air stream path and is rotatably installed inside the housing portion for selectively providing air received from the main path to the second and third paths. A heat exchanger is installed in the main path, and a door unit is installed on the boundary between the housing portion and the main path of the main body for allowing some or all of the air supplied from the blower unit to pass to the housing portion or to pass to the housing portion via the heat exchanger.

According to another aspect of the present invention, a case of an air conditioning system for a car includes a main body having a main path through which air supplied from a blower unit passes and a first path formed at the exit of the main path. A housing portion formed on top of the main body has a plurality of paths communicating with the main path formed therein. A partition plate is installed in the housing so as to divide the plurality of paths and a space inside the housing portion. A plurality of rotating doors having an air stream path are rotatably installed in the housing portion for selectively supplying air received from the main path to the plurality of paths. A heat exchanger is installed on the main path, and a door unit is installed on the boundary between the housing portion and the main path of the main body for allowing some or all of the air supplied from the blower unit to pass to the housing portion or to pass to the housing portion via the heat exchanger.

BRIEF DESCRIPTION OF THE DRAWINGS

The above objects and advantages of the present invention will become more apparent from the following detailed description a preferred embodiment thereof and the attached drawings in which.

DETAILED DESCRIPTION OF THE INVENTION

Figure 1:
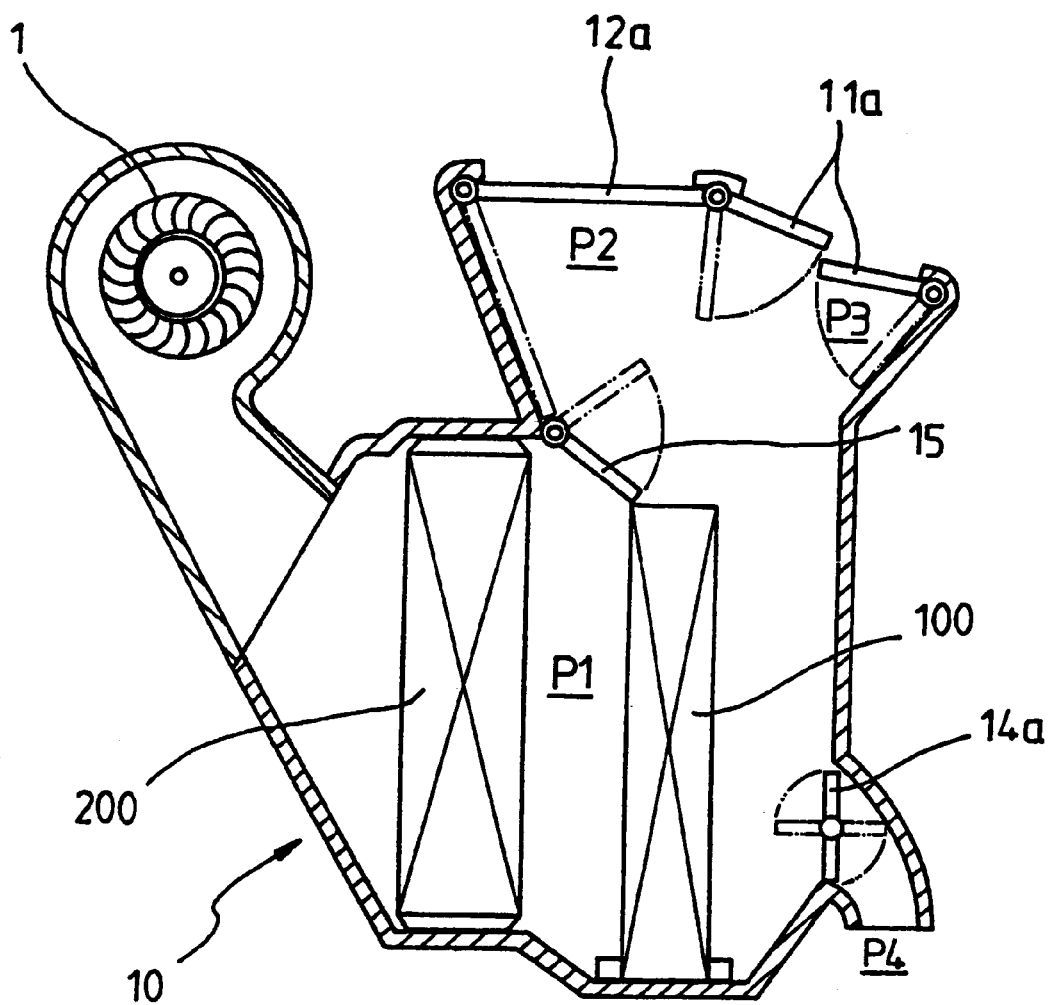
FIG. 1 is a sectional view showing the case of a conventional air conditioning system.
Figure 2:
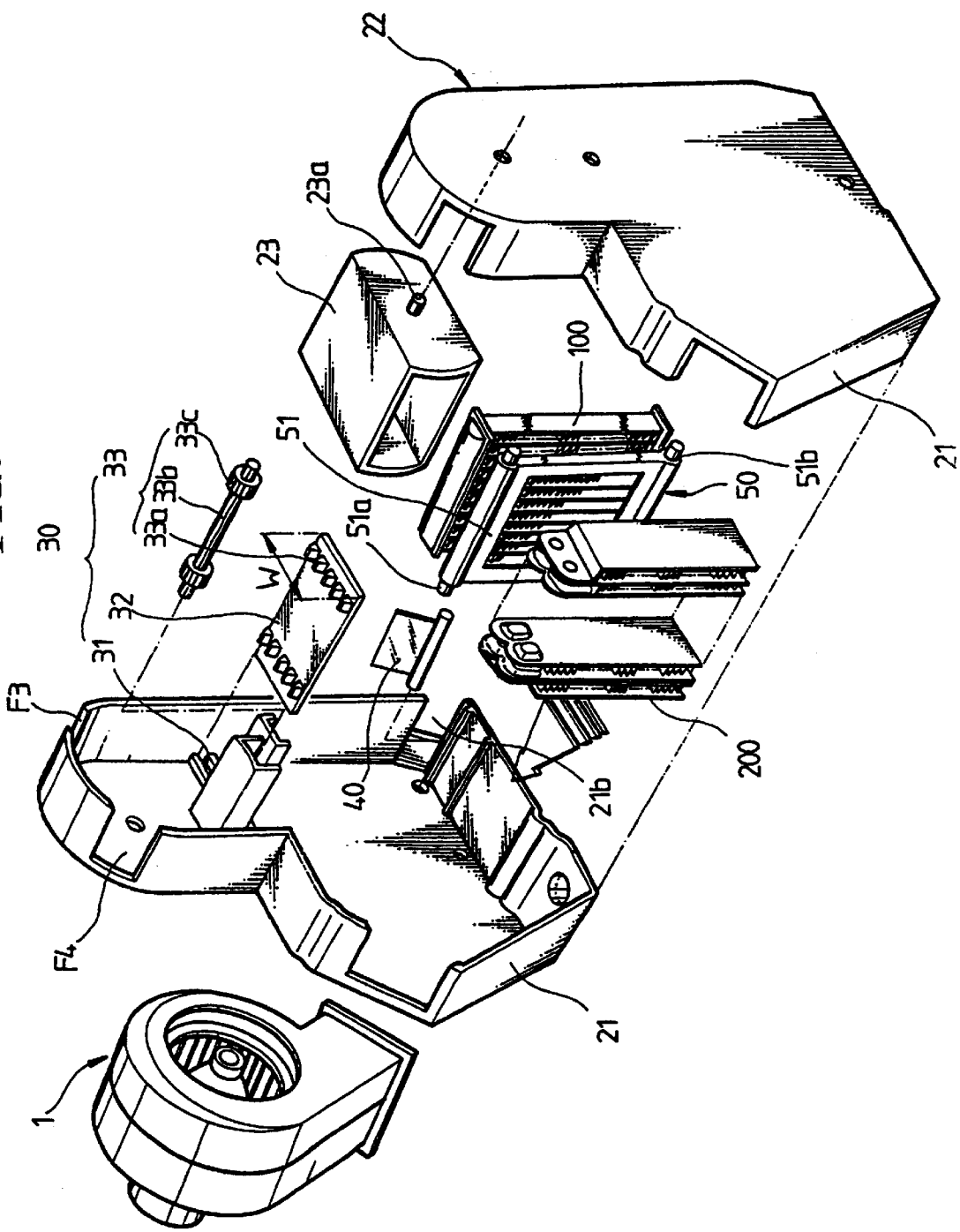
FIG. 2 is an exploded perspective view showing a case of an air conditioning system according to an embodiment of the present invention.
Figure 3:
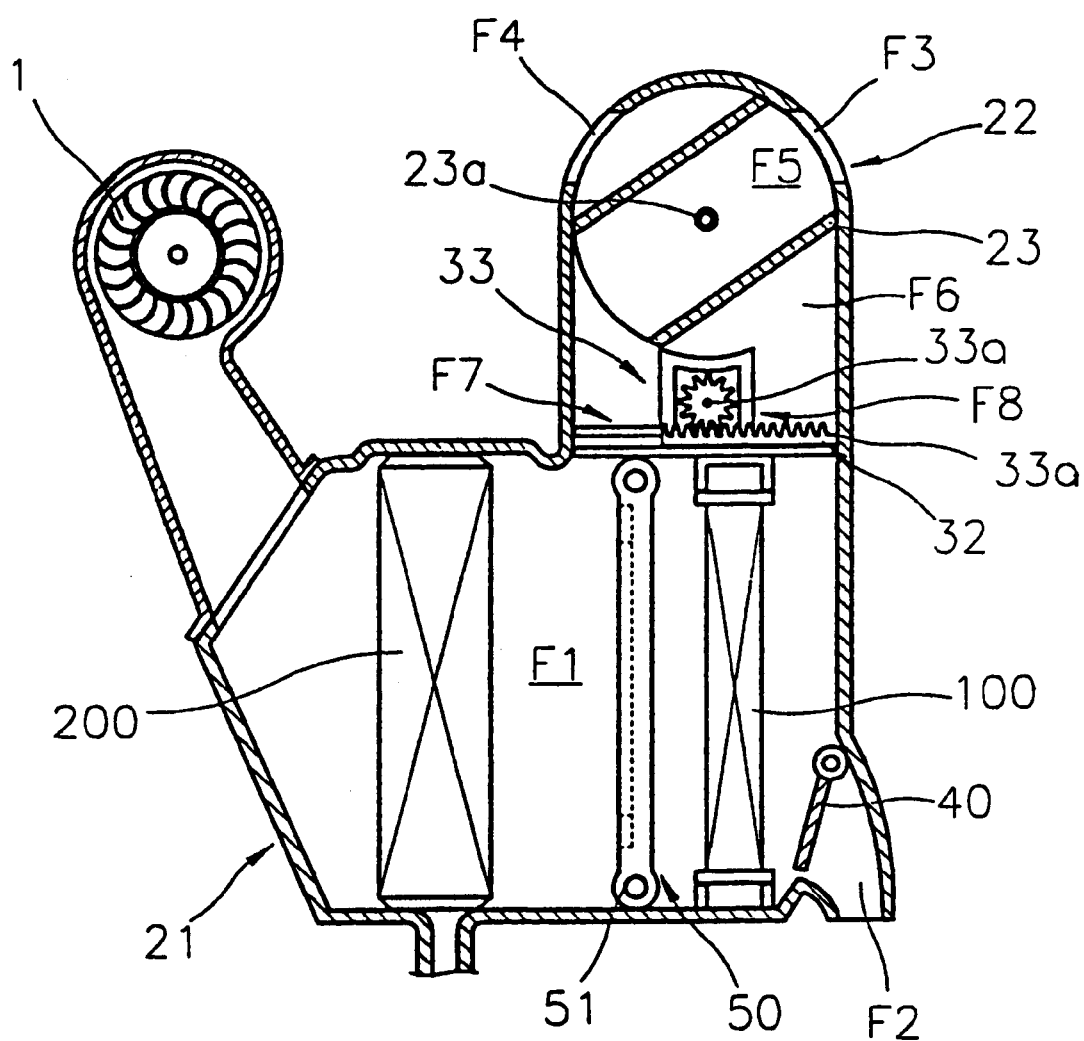
FIG. 3 is a sectional view showing the case of the air conditioning system shown in FIG. 2.

Referring to FIGS. 2 and 3, a case of an air conditioning system according to an embodiment of the present invention includes a main body 21 having a main path F1 and a first path F2 is formed toward the floor (not shown) on the exit side of the main path F1. A blower unit 1 is installed on the entrance side of the main path F1. A housing portion 22 is formed on the upper surface of the main body 21. The upper surface of the housing portion 22 is semi-cylindrical and has a predetermined curvature. A second path F3 connected to a duct (not shown) toward a vent and a third path F4 connected to a duct (not shown) toward a defrost portion are formed in the housing portion 22.

A rotating door 23 for selectively providing air to the second path F3 and the third path F4 is rotatably supported by a rotating shaft 23a in the housing portion 22. Both ends of the rotating door 23 have the same curvature as the inner upper surface of the housing portion 22 and an air stream path F5 is formed in the rotating door 23. The shape of the rotating door 23 can vary according to the shape of the housing portion 22.

A heater core 100 which is a heat exchanger is installed in the main body 21 to divide the entrance of a path F6 in the housing portion 22 into two parts while facing the main path F1. An evaporator 200 which is a heat exchanger and through which a refrigerant passes is installed at the upper stream of the heater core 100 in the main path F1. Also, door unit 30 for allowing some or all of the air stream from the main path F1 to flow to the housing portion 22 or providing air has passed through the heater core 100 to the housing portion 22 is installed on the boundary between the main path F1 in the main body 21 and a path F6 of the housing portion 22.

The door unit 30 includes guide rails 31 formed to face each other on the inner side surfaces of the main body 21, a sliding door 32 slidingly installed along the guide rails 31, and a driving portion 33 for moving the door 32 along the guide rails 31.

The driving portion 33 includes a rack 33a formed on the upper surface of the sliding door 32 and a pinion 33c fixed to a rotating shaft 33b and engaged with the rack 33a. The sliding door 32 has a width W capable of closing one of paths F7 and F8 which are divided by the heater core 100.

A door 40 operated by a cable connected to an actuator (not shown) or a controller for opening and closing the first path F2 is installed in the entrance of the first path F2.

Opening/closing means 50 for regulating the stream of air into the heater core 100 is installed in the main body 21. The opening/closing means 50 includes a film door 51 formed of flexible resin or air-proof coated cloth and a pair of rollers 51a and 51b on which both ends of the film door 51 are wound. The rollers 51a and 51b are rotated by a motor (not shown). Another example of the opening/closing means may be a valve (not shown) for intercepting the flow of engine cooling water into the heater core.

In the operation of the case of the air conditioning system for a car according to the present invention, as a cooling or heating mode is set, the rotating door 23, the door unit 30, and the door 40 of the first path F2 are selectively operated, thus changing the stream of the air supplied to the respective portions of the inside of the car. The operating states of the door are shown in FIGS. 6 through 14. The operation of the door according to a cooling mode is described with reference to the above drawings.

Figure 6:
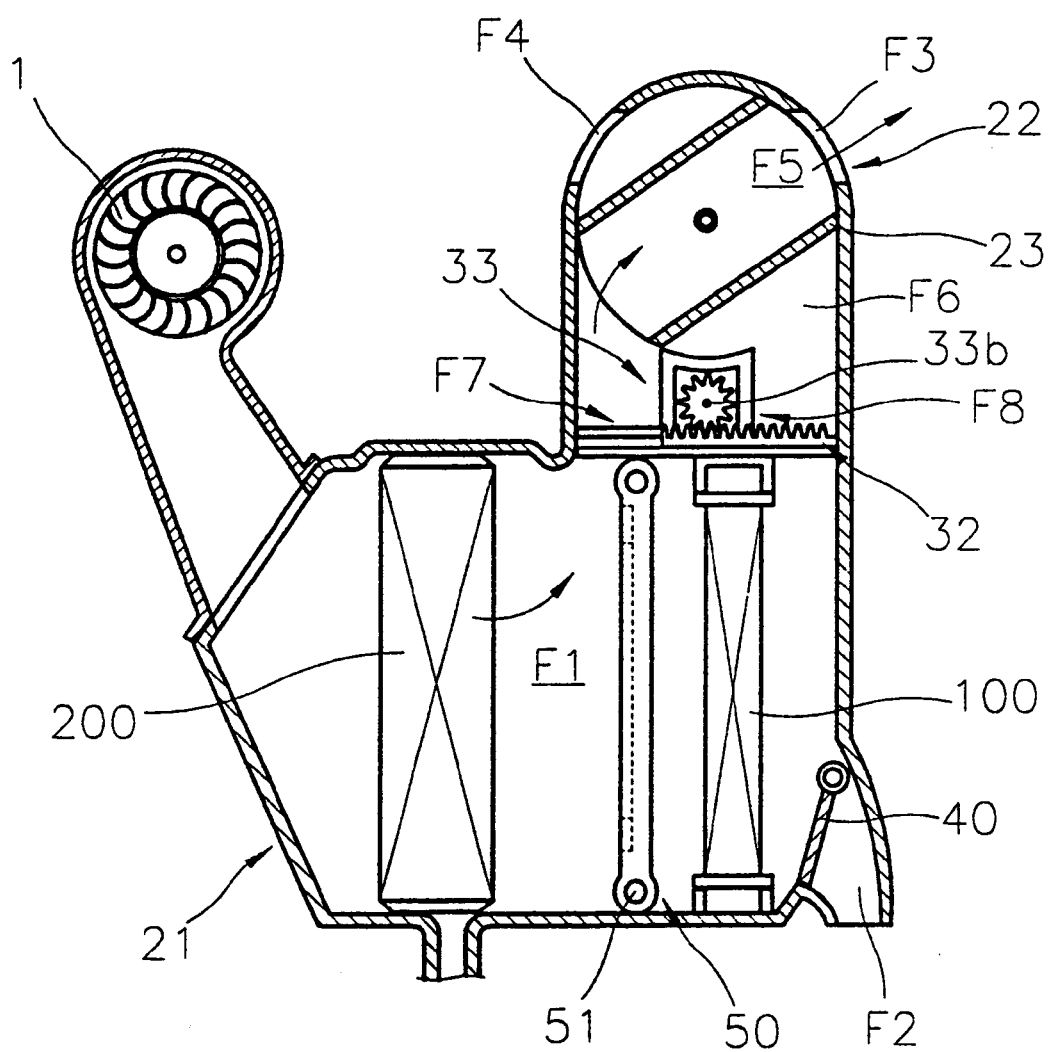
FIGS. 6 through 14 are sectional views showing the operating states of the case of the air conditioning system according to the embodiment of the present invention shown in FIG. 2.

As shown in FIG. 6, a path F7 is opened and a path F8 is closed in order to blow air, which is supplied from the blower unit 1 to the main path F1, passed through the evaporator 200, and cooled, to the second path F3 connected to a vent (not shown). Namely, the path F8 is blocked by moving the sliding door 32 by the rotation of the rotating shaft 33b of the driving portion 33 (FIG. 2). At this time, the door 40 of the first path F2 is closed. The rotating door 23 is rotated by a driving means (not shown) for allowing the path F7 to communicate with the second path F3. The film door 51 of the opening/closing means 50 blocks the stream of air into the heater core 100.

Therefore, the air which is blown from the blower unit 1 and passed through the evaporator 200 is exhausted into the second path F3 through the path F7 and the path F5 of the rotating door 23 and is blown into the vent inside the car.

Figure 7:
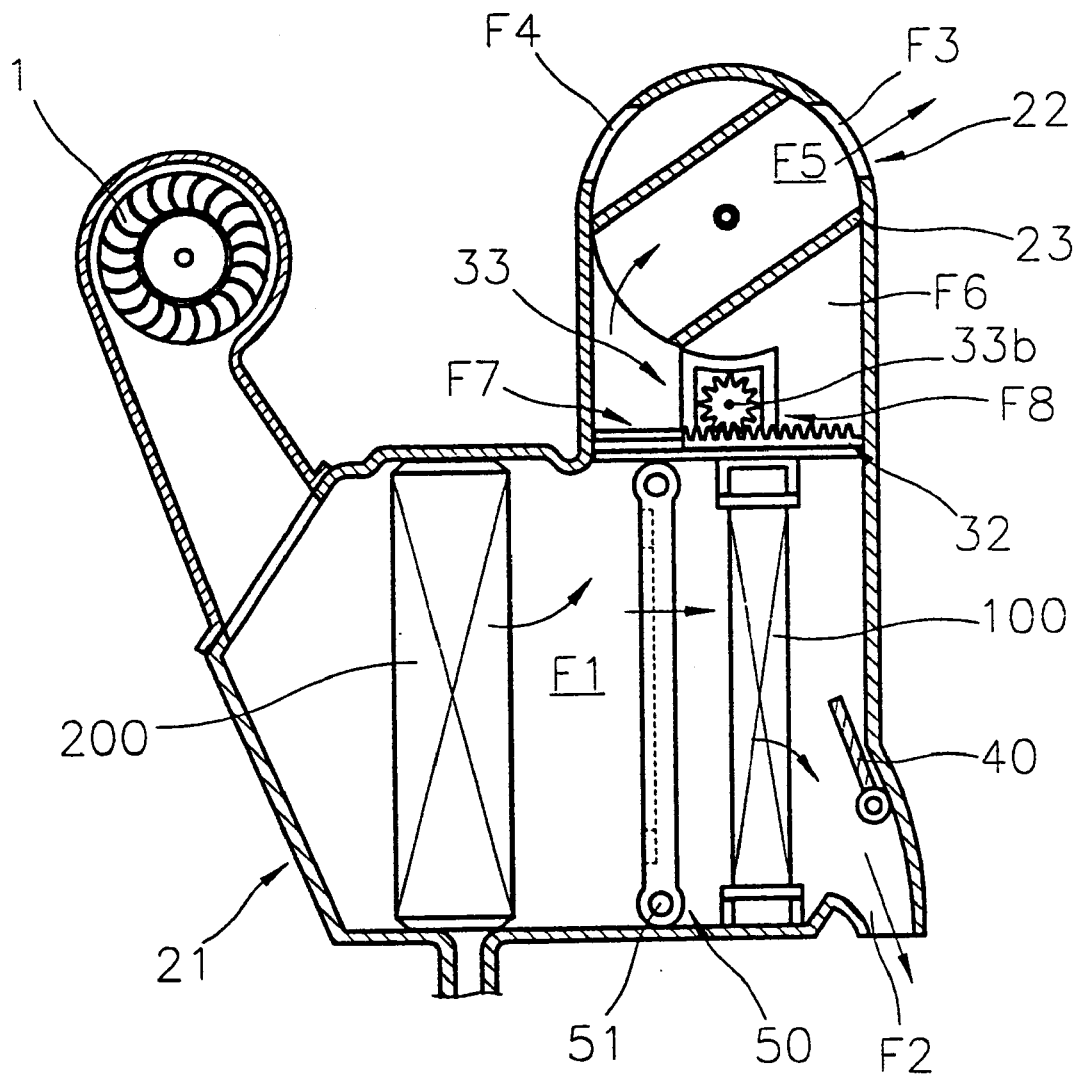

In this state, as shown in FIG. 7, some of the air flowing through the main path F1 flows to the first path F2 connected to a floor (not shown) by the opening of door 40. In the case that the film door is not used, the supply of cooling water from the engine to the heater core 100 is prevented by operating a valve (not shown) installed in the entrance of the heater core 100.

Figure 8:
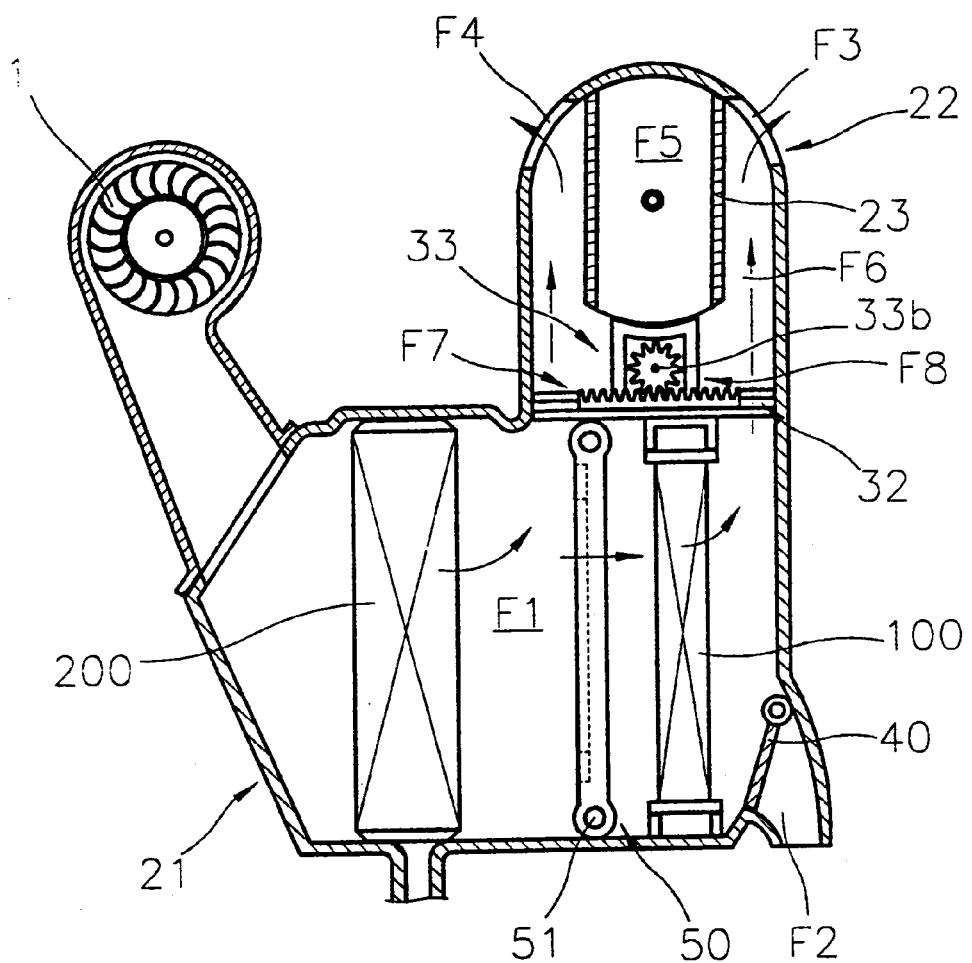

In order to simultaneously blow air supplied from the blower unit 1 and cooled through the evaporator 200 to the second path F3 connected to the vent and the third path F4 connected to a defrost portion (not shown), the paths F7 and F8 are simultaneously opened by centering the sliding door 32 by the driving means as shown in FIG. 8. At this time, the first path F2 is closed by the door 40. Also, the rotating door 23 is rotated to be vertical.

Therefore, the air supplied to the main path F1 is cooled passing through the evaporator 200 and is exhausted to the second path F3 and the third path F4 through the paths F7 and F8. Next, the operation of the doors during a heating mode will be described.

Figure 9:
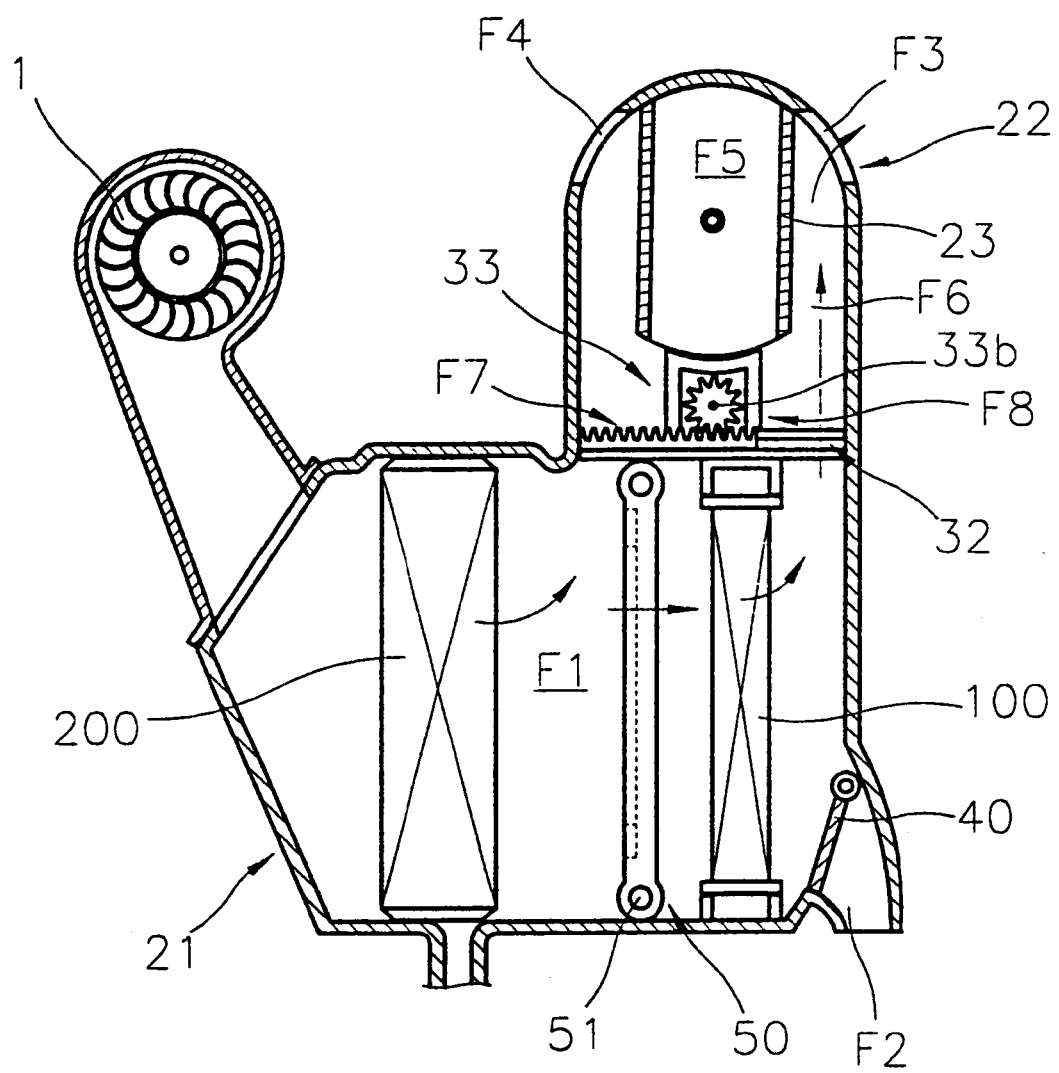

In order to supply air from the blower unit 1 which is heated by passing through the heater core 100 to the vent and defrost portion (not shown) of a car, path F7 is closed and path F8 is opened by moving the sliding door 32 by the driving portion 33 of the door unit 30 (FIG. 2) as shown in FIG. 9. The first path F2 is closed by door 40 and rotating door 23 is rotated to be vertical.

In this state, the air supplied from the blower unit 1 is heated by passing through the heater core 100 installed on the main path F1 and is exhausted to the second path F3 through the path F8. At this time, a refrigerant is not supplied to the evaporator 200.

Figure 10:
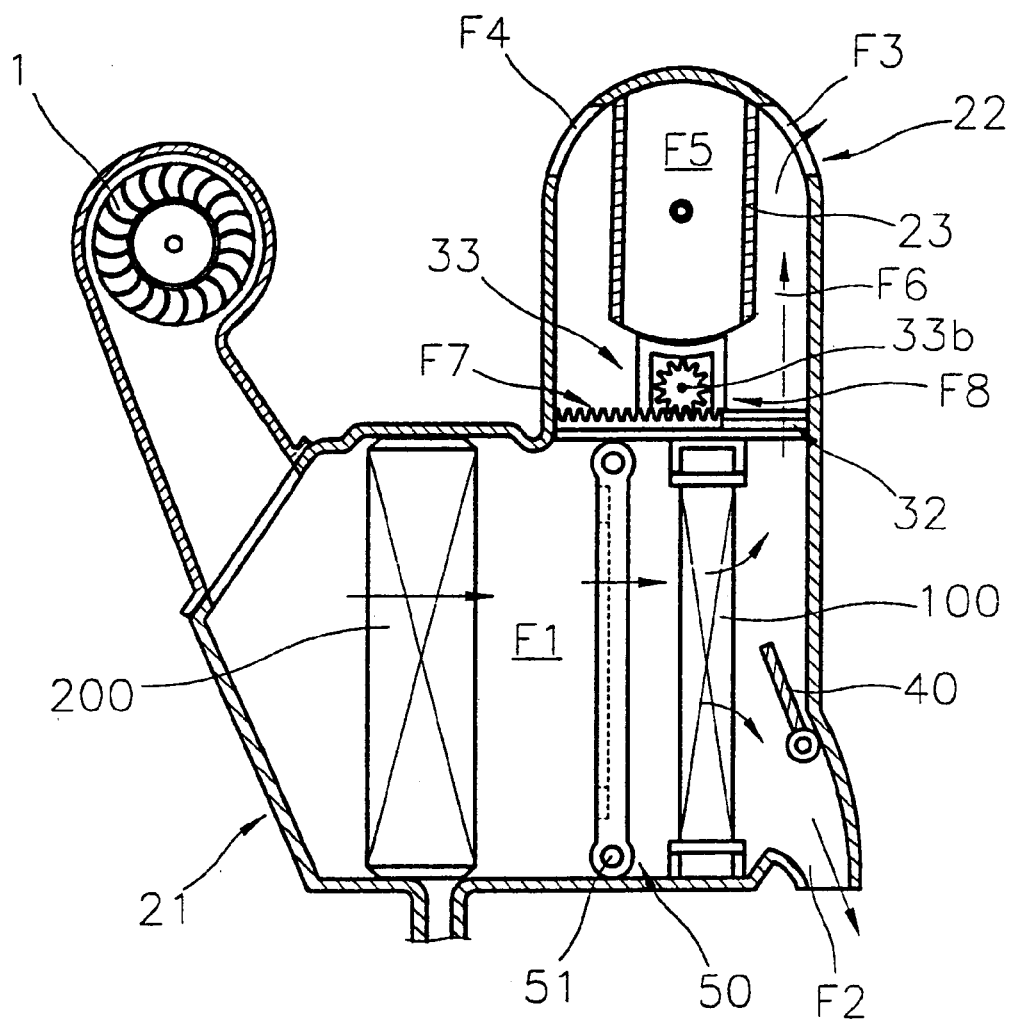

Meanwhile, door 40 is opened as shown in FIG. 10 in order to supply the air which has passed through the heater core 100 to the first path F2 communicating with the floor. Then, some of the air which is passed through the heater core 100 is blown to the floor of the car through the first path F2.

Figure 11:
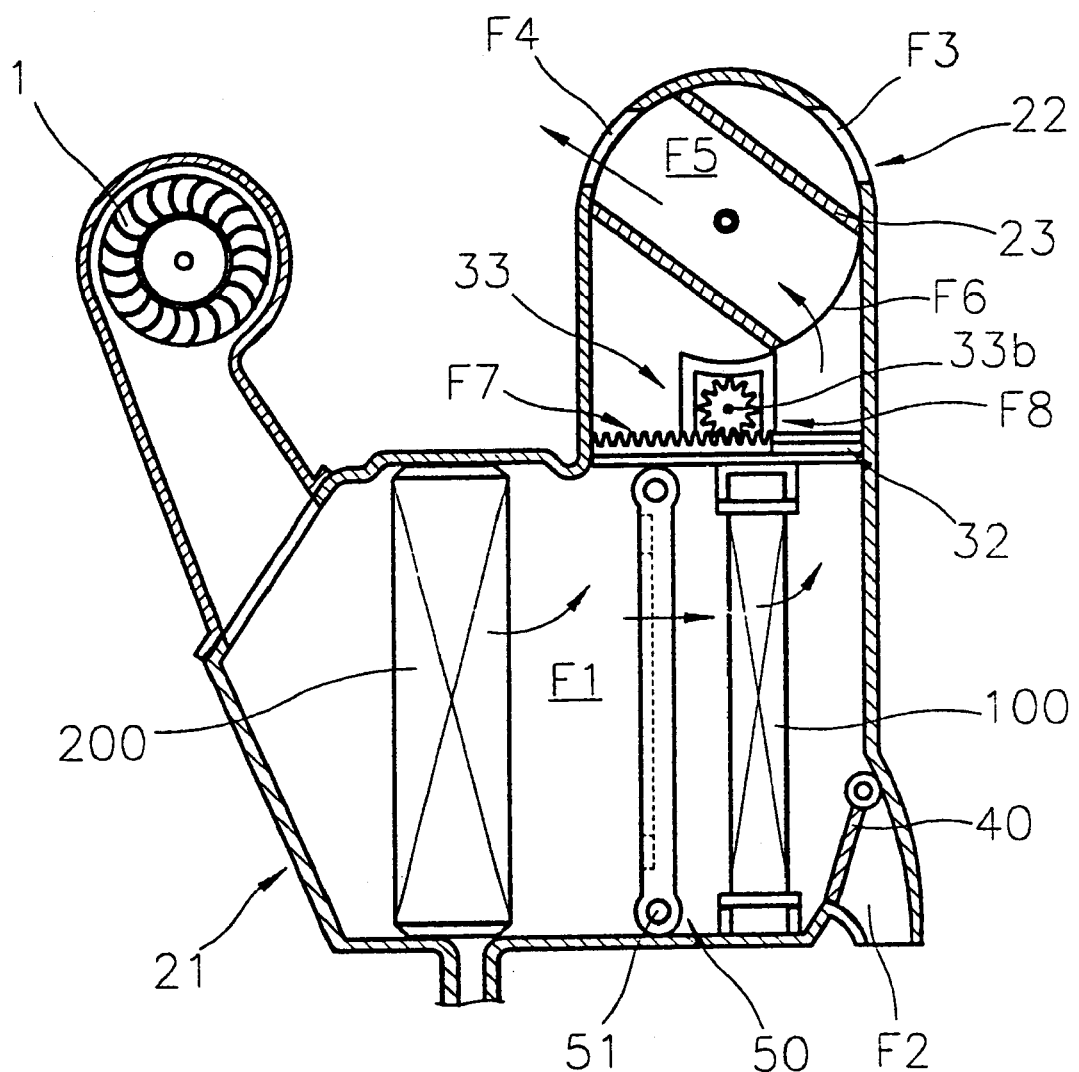

In the case of a defrost mode for removing frost from windows, path F7 is closed and path F8 is opened by the sliding door 32 as shown in FIG. 11. The rotating door 23 is rotated so that the path F8 communicates with the third path F4 by the air stream path F5. Therefore, the air which is passed through the main path F1 is heated by passing through the heater core 100, passed through the paths F8 and F5 and a third path F4, and is supplied to the window.

Figure 12:
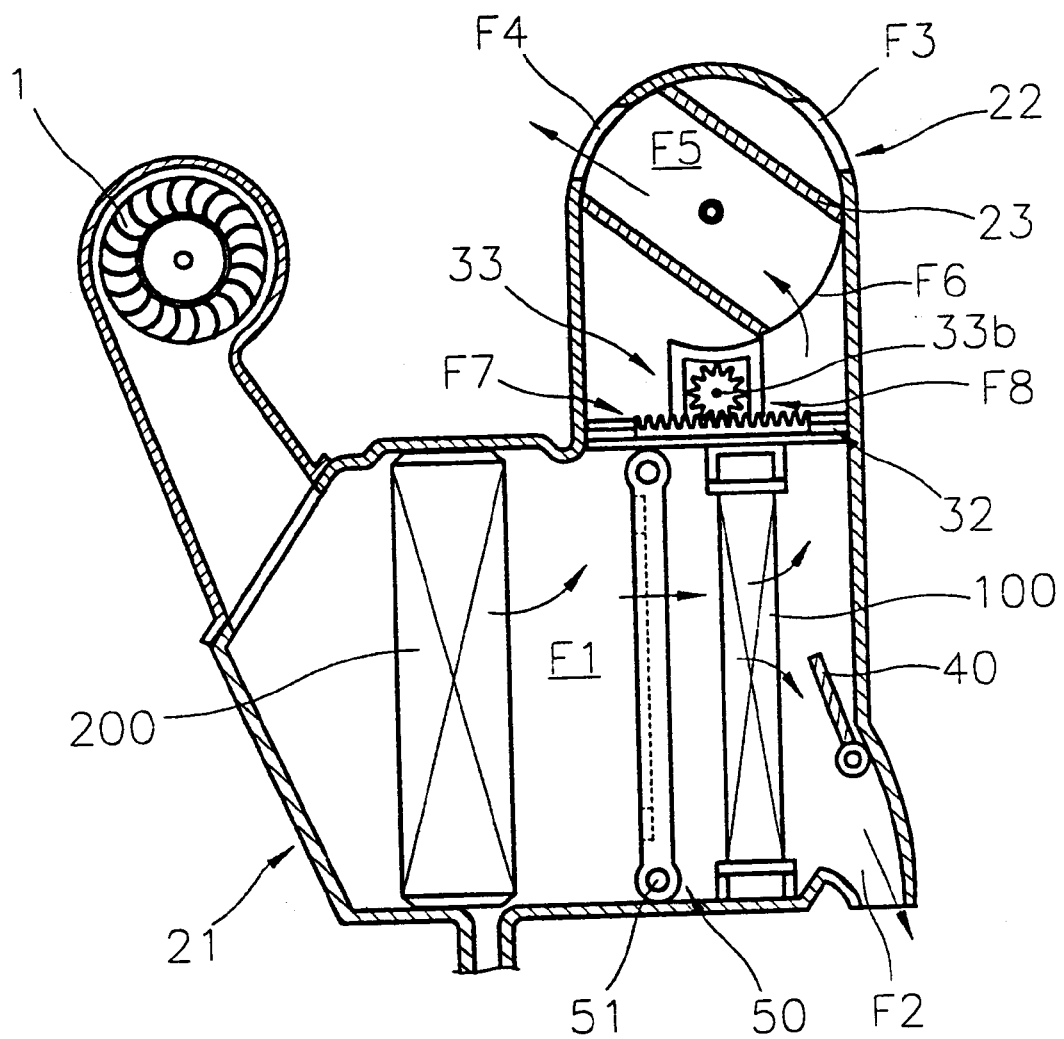

In the above-mentioned defrost mode, it is possible to direct heated air to the floor of the car through a first path F2 by opening door 40 as shown in FIG. 12.

Figure 13:
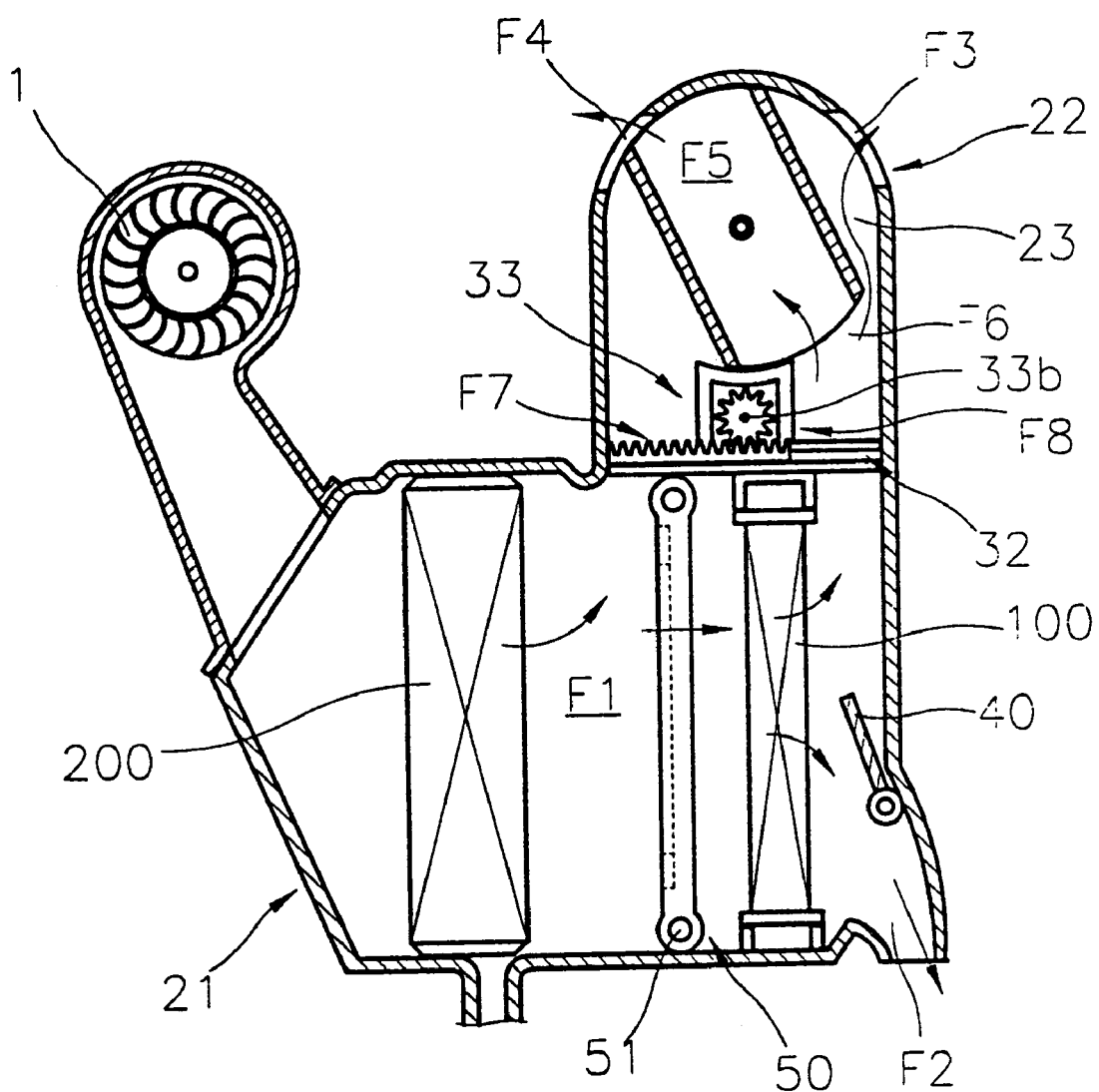
Figure 14:
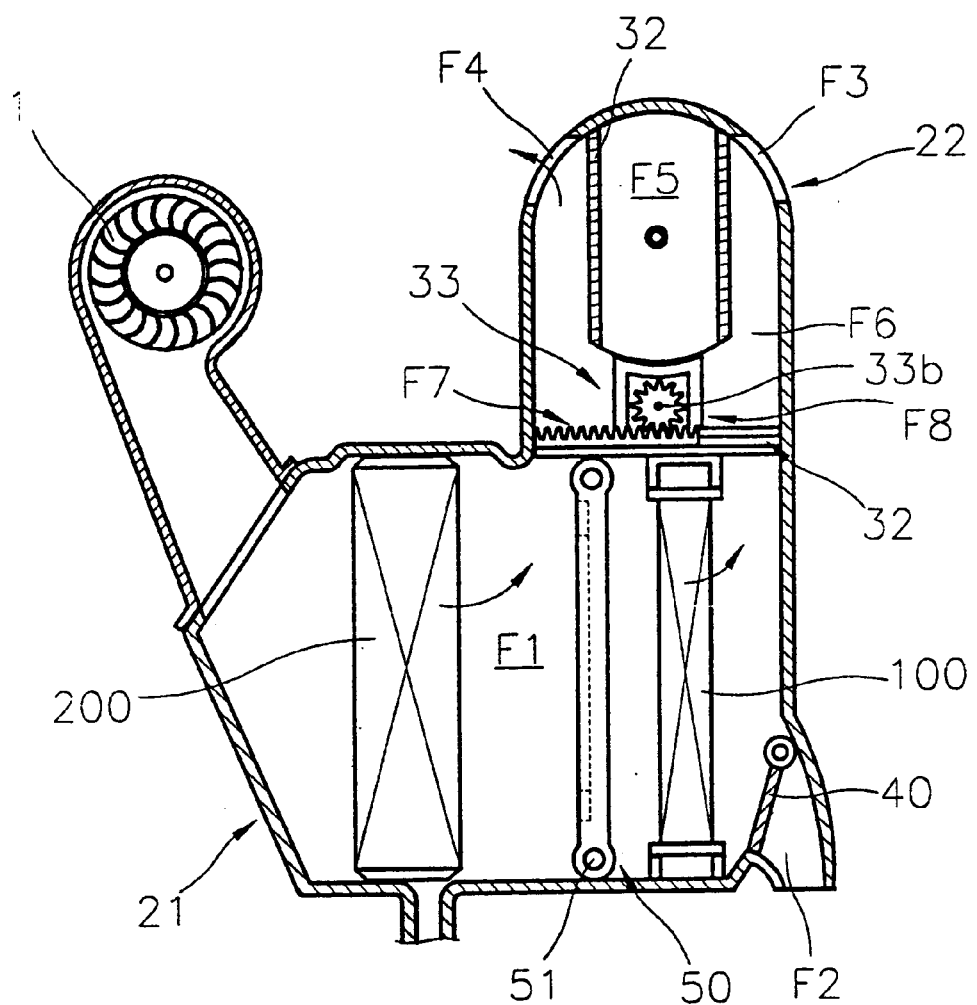

In order to supply air to the defrost portion and the vent during the heating mode, the path F7 is closed and the path F8 is opened by moving the sliding door 32 as shown in FIG. 13. The air stream path F5 partially communicates with the third path F4 due to rotation of the rotating door 23. Therefore, some of the air passed through the path F8 can flow to the second path F3.

In the case of the defrost mode using cool air, the path F8 is closed by moving the slide door 32 and the path F7 communicates with the third path F4 due to rotation of the rotating door 23 to be vertical. Therefore, the air which is passed through the evaporator 200 passes through the path F7 and flows to the third path F4. At this time, it is possible to direct the air which passed through the heater core 100 to the first path F2 connected to the floor by opening the door 40.

The above-mentioned operation is performed in the same way during the cooling mode. During the cooling mode, the refrigerant flows through the evaporator and the cooling water of the engine does not flow through the heater core.

Figure 4:
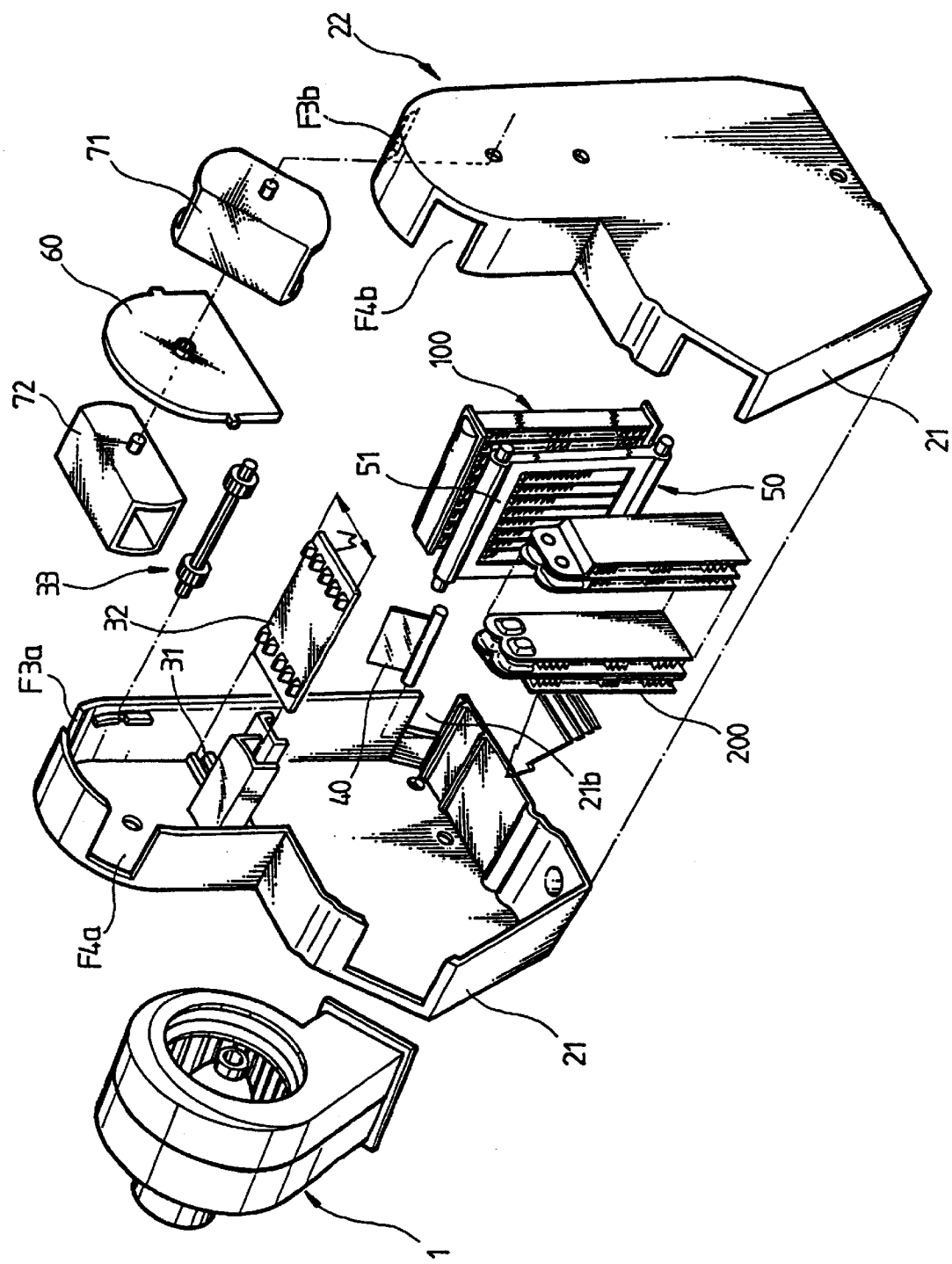
FIG. 4 is an exploded perspective view showing the case of an air conditioning system according to another embodiment of the present invention.

FIG. 4 shows the case of an air conditioning system according to another embodiment of the present invention. The same reference numerals of the previously shown drawings denote identical members.

Figure 5:
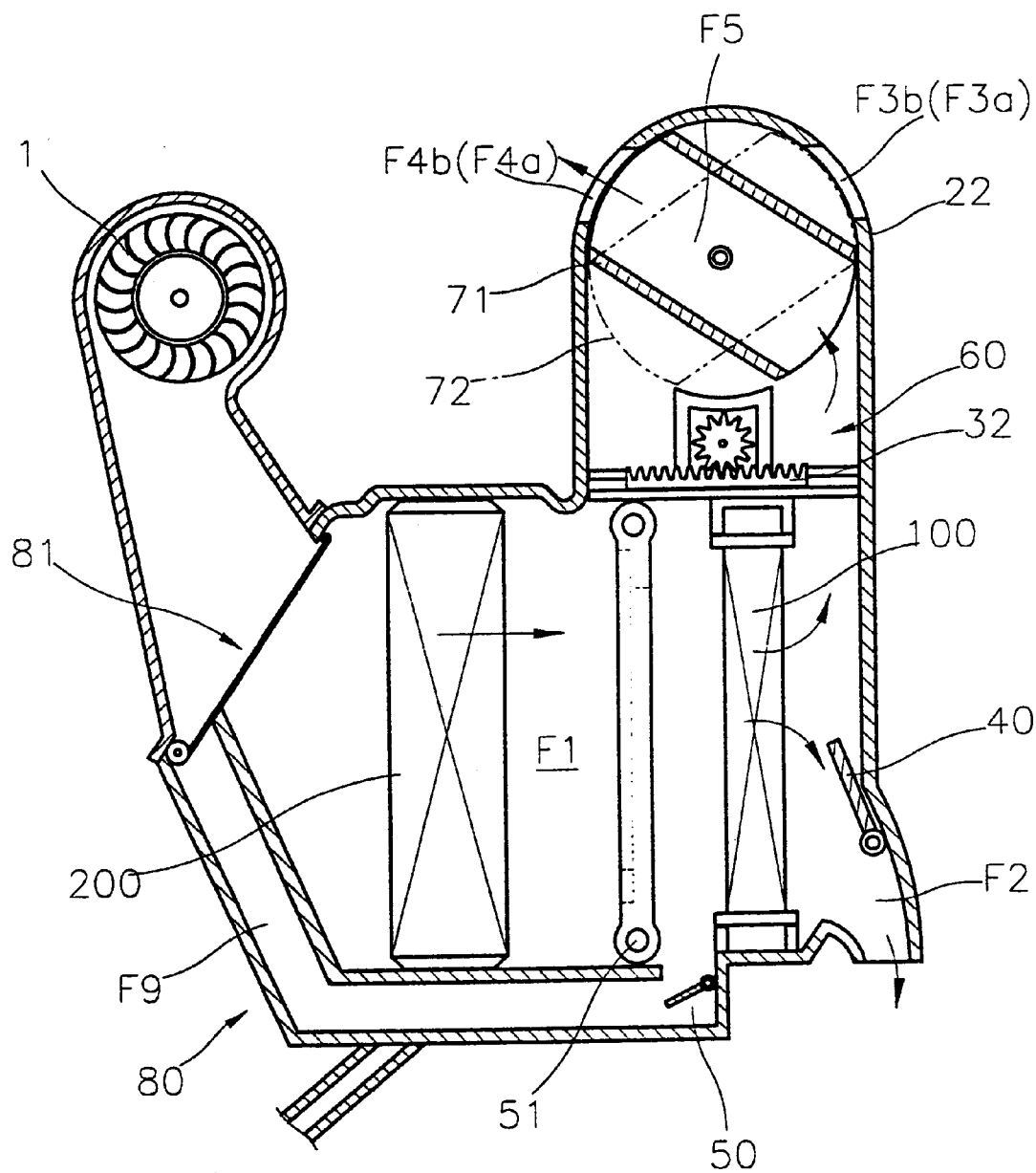
FIG. 5 is a sectional view showing the case of the air conditioning system according to still another embodiment of the present invention.

As shown in FIGS. 4 and 5, a partition plate 60 for forming two second paths F3a and F3b and two third paths F4a and F4b by vertically dividing the inner space of housing portion 22 is installed in the housing portion 22. Rotating doors 71 and 72 driven by driving means (not shown) are installed in the housing portion 22 divided by the partition plate 60. A general controlling cable, driving motor, and rack and pinion can be used as the driving means.

As shown in FIG. 5, a bypass path F9 can be formed so as to connect the exit of the blower unit 1 to the space between the door unit 50 and the heater core 100 in the main body 21. A door 81 for selectively supplying air blown from the blower unit 1 to the bypass path F9 and the main path Fl can be installed at the exit of the blower unit 1. The above-mentioned film door is preferably used as the door 81.

According to the present invention, the front seat and rear seat of a car can be separately cooled and heated by operating the rotating doors 71 and 72. Such an operation is described with reference to FIGS. 15 through 16.

Figure 15:
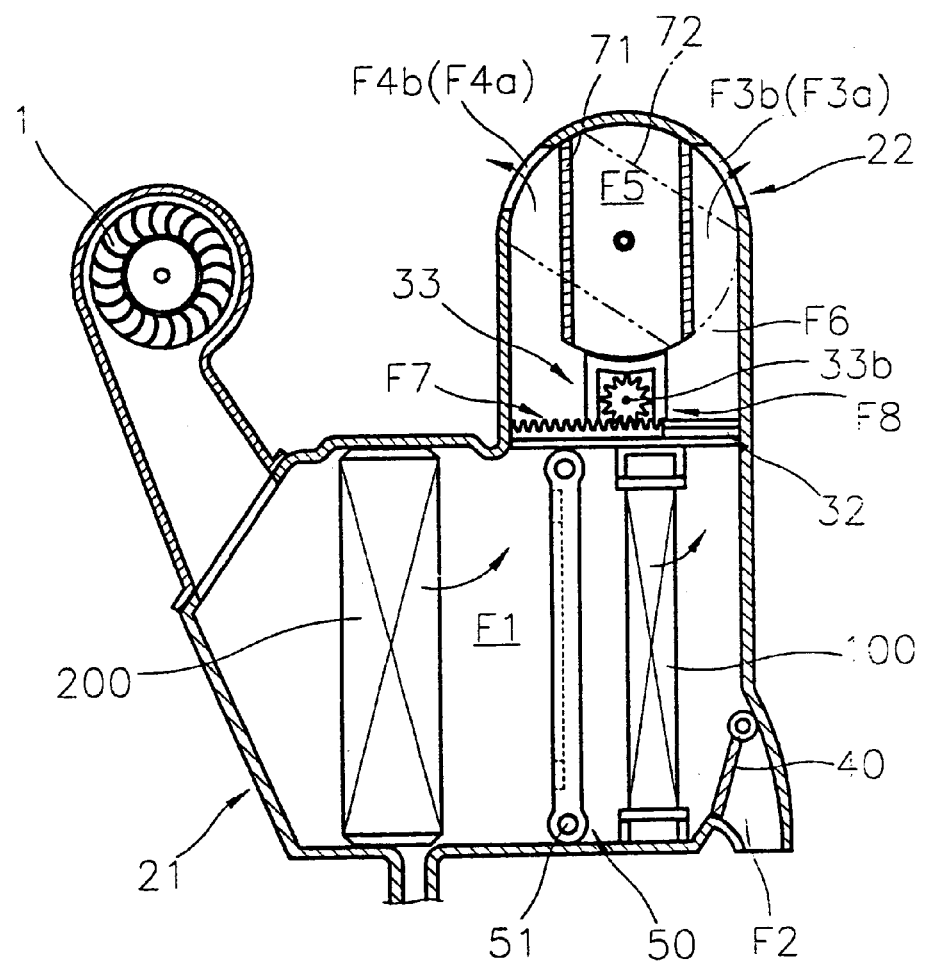
FIGS. 15 through 16 are sectional views showing the operating states of the case of an air conditioning system according to the embodiment of the present invention shown in FIG. 4.
Figure 16:
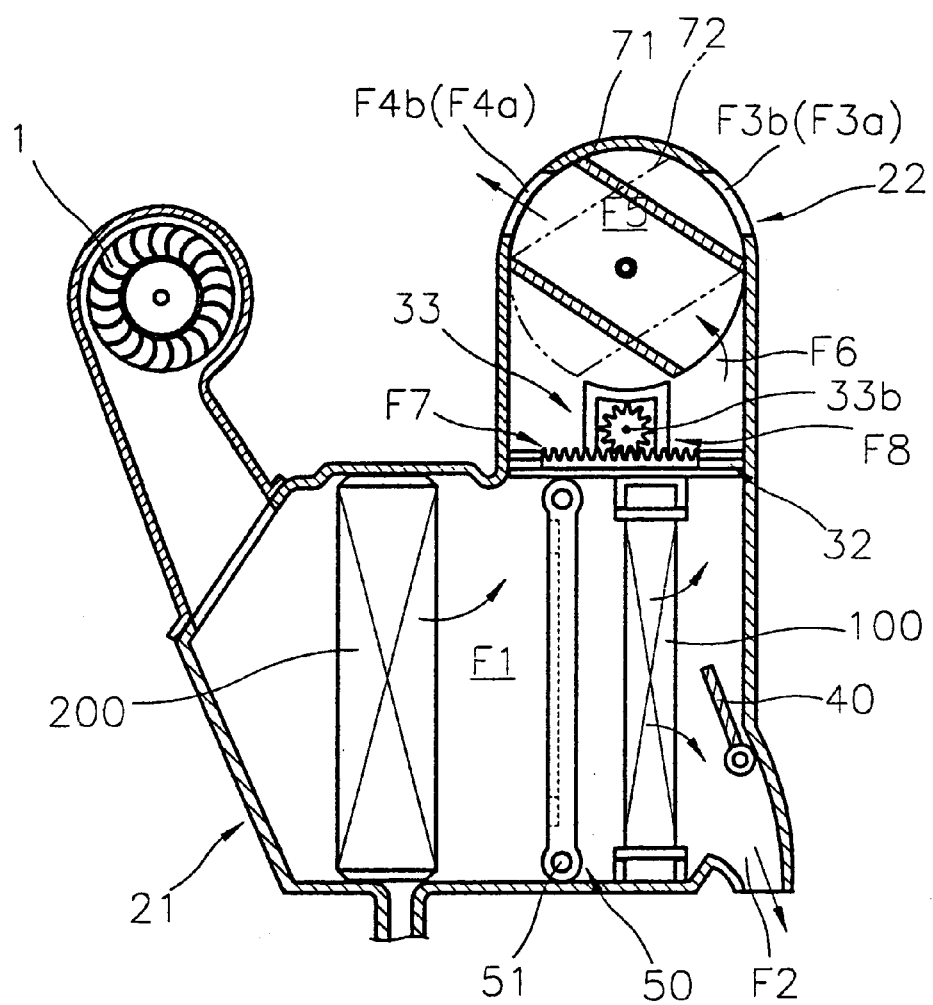

As shown in FIG. 15, the paths F7 and F8 are selectively opened and closed by moving the sliding door 32 by the driving portion 33 (FIG. 4). At this time, the door 40 of the first path F2 is closed. The paths F7 and F8 selectively communicate with the second paths F3a and F3b and the third paths F4a and F4b by rotating the rotating doors 71 and 72. Namely, as shown in FIG. 15, the path F8 can communicate with the third path F4a by the rotating door 72. Also, as shown in FIG. 16, the path F7 and the path F8 can respectively communicate with the second path F3a and the third path F4b by the doors 71 and 72 in a state in which the paths F7 and F8 are opened by centering the sliding door 32.

Therefore, the air supplied from the blower unit 1 can be supplied to the front seat, the rear seat, and the defrost portion of the car by selectively flowing air to the second paths F3a and F3b and the third paths F4a and F4b after passing through the heater core 100.

In this state, it is possible to make some of the air which is passed through the heater core 100 pass through the first path F2 and be blown to the floor.

The operation of the above-mentioned air conditioning system case is not restricted to the above-mentioned embodiment. Various modes can be set by manipulating the intercepting means, the door unit, and the door.

In the case of the air conditioning system according to the present invention, it is possible to simplify the structure and to reduce the amount of space required for installing the door by using a rotating door and a sliding door in order to open and close the respective paths formed in the case. Also, it is possible to reduce interference against the flow of air since the rotating door acts as a path.

Further, it is possible to separately cool and heat different areas inside a car and to simultaneously realize a vent mode, a defrost mode and a floor mode by separately operating a plurality of rotating doors.

The case of the air conditioning system according to the present invention is not restricted to the above-mentioned embodiment and many variations are possible within the scope and spirit of the present invention by anyone skilled in the art.

What is claimed is:

1. A case of an air conditioning system for a car, comprising:

a main body having a main path through which air supplied from a blower unit passes and a first path formed at the exit of said main path;

a housing portion formed on top of said main body, in which an entrance path communicating with said main path and a plurality of paths for discharging air are formed, and which is semi-cylindrical, in its inner surface;

at least one rotating door rotatably installed inside said housing portion for selectively providing air received from said main path to said paths in the housing portion, and having entrance and exit ends with the same curvature as the inner surface of the housing portion and an air stream path therein;

an evaporator located in said main path at a blower unit side;

a heater core located in said main path, dividing the entrance path in the housing portion into two parts; and at least one door unit installed on the boundary between said housing portion and said main path of said main body, for allowing some or all of the air supplied from said blower unit to pass to said housing portion or to pass to said housing portion via said heater core, the door units each having guide rails on the inner surface of said housing portion, facing each other, a sliding door slidably installed along said guide rails, and a driving portion for sliding said sliding door along said guide rails.

2. A case of an air conditioning system for a car as claimed in claim 1, wherein said driving portion comprises:

a pinion fixed to a rotating shaft installed in said housing portion; and a rack formed in said sliding door so as to engage with said pinion.

3. A case of an air conditioning system for a car as claimed in claim 1, further comprising opening/closing means for regulating the stream of the air passing through said main path to said heater core.

4. A case of an air conditioning system for a car as claimed in claim 3, wherein said opening/closing means comprises:

a film door; and a pair of rollers on which both ends of said film door are wound.

5. A case of an air conditioning system for a car as claimed in claim 4, wherein a bypass path for supplying some of the air supplied from said blower unit to a space between said opening/closing means and said heat exchanger is formed in said main body and a door for selectively supplying the air supplied from said blower unit to said bypass path and said main path is installed in the entrance of said bypass path.

6. A case of an air conditioning system for a car as claimed in claim 1 including:

a partition plate installed in said housing and partitioning said housing portion; and a second rotating door having an air stream path formed therein and rotatably installed in said housing portion on an opposite side of said partition plate from said first rotating door for selectively supplying air received from said main path to two different paths.

7. A case of an air conditioning system for a car as claimed in claim 1, wherein said first rotating door has first and second opposing walls and third and fourth opposing walls extending transversely between said first and second walls, each of said walls extending between first and second ends of said first rotating door, said air stream path being surrounded by said first through fourth walls.

8. A case of an air conditioning system for a car as claimed in claim 3, wherein said opening/closing means can be closed to block air from said main path from flowing through said heater core.

9. A case of an air conditioning system for a car as claimed in claim 8, wherein said opening/closing means is installed on an upstream side of said heater core.

10. A case of an air conditioning system for a car as claimed in claim 6, wherein said partition plate is perpendicular to said heater core heat exchanger.

11. A case of an air conditioning system for a car as claimed in claim 6, wherein said first and second rotating doors are rotatable independently of each other.

12. A case of an air conditioning system for a car as claimed in claim 6, wherein said first and second rotating doors are rotatable about a common rotational axis.

* * * * *